United States Patent
Vargo, Jr. et al.

(10) Patent No.: US 9,061,584 B2
(45) Date of Patent: Jun. 23, 2015

(54) HANGER ASSEMBLY

(75) Inventors: Michael Edward Vargo, Jr., Huntington, IN (US); Matthew David Friede, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 98 days.

(21) Appl. No.: 13/978,744

(22) PCT Filed: Feb. 22, 2011

(86) PCT No.: PCT/US2011/025673
§ 371 (c)(1),
(2), (4) Date: Jul. 9, 2013

(87) PCT Pub. No.: WO2012/115622
PCT Pub. Date: Aug. 30, 2012

(65) Prior Publication Data
US 2013/0334381 A1  Dec. 19, 2013

(51) Int. Cl.
*F16M 7/00* (2006.01)
*B60K 15/07* (2006.01)
*B60K 15/067* (2006.01)

(52) U.S. Cl.
CPC ............ *B60K 15/07* (2013.01); *Y10T 29/49895* (2015.01); *B60K 15/067* (2013.01)

(58) Field of Classification Search
CPC ............ F16M 7/00; H02K 5/00; F02B 67/00; B60K 5/12
USPC ............... 248/674, 675, 201, 220.21, 221.11, 248/222.14, 222.51, 223.31, 223.41, 224.8, 248/225.21
See application file for complete search history.

(56) References Cited

U.S. PATENT DOCUMENTS

| 2,662,988 | A | * | 12/1953 | McKim | 310/91 |
| 3,536,280 | A | * | 10/1970 | Barlow | 248/676 |
| 4,143,843 | A | * | 3/1979 | Ehrens et al. | 248/544 |
| 4,945,272 | A | * | 7/1990 | Ochi et al. | 310/91 |
| 5,944,298 | A | * | 8/1999 | Koike | 248/674 |
| 6,082,715 | A | | 7/2000 | Vandermolen | |
| 6,120,082 | A | | 9/2000 | Vandermolen | |
| 7,401,757 | B2 | * | 7/2008 | Lomp | 248/681 |
| 7,510,163 | B2 | * | 3/2009 | Schlitzkus et al. | 248/635 |
| 8,342,477 | B2 | * | 1/2013 | Kneshtel et al. | 248/674 |
| 2004/0084602 | A1 | * | 5/2004 | Heyder et al. | 248/674 |
| 2004/0084981 | A1 | * | 5/2004 | Ortt et al. | 310/89 |
| 2005/0023912 | A1 | * | 2/2005 | Lin et al. | 310/89 |
| 2006/0043818 | A1 | * | 3/2006 | Chen | 310/239 |
| 2008/0149807 | A1 | * | 6/2008 | Chen | 248/675 |
| 2008/0230496 | A1 | * | 9/2008 | Henderson et al. | 211/26 |
| 2012/0119059 | A1 | * | 5/2012 | Crane et al. | 248/674 |

OTHER PUBLICATIONS

Search Report from corresponding PCT application in the same family.

* cited by examiner

*Primary Examiner* — Terrell McKinnon
*Assistant Examiner* — Michael McDuffie
(74) *Attorney, Agent, or Firm* — Jeffrey P. Calfa; Mark C. Bach

(57) ABSTRACT

A hanger assembly includes a first bracket having a first side surface, a second side surface, and a locating pin extending from the second side surface. The assembly includes a mounting bracket configured to nest with the first bracket, where the mounting bracket has a base portion, and an extension portion extending generally perpendicularly from the base portion. The extension portion has a first side surface, a second side surface, and a top surface. A mounting bolt extends from the second side surface of the mounting bracket, through the mounting bracket, and through the first bracket to the first side surface of the first bracket. The first surface and/or the top surface of the extension portion are configured to receive the locating pin.

16 Claims, 9 Drawing Sheets

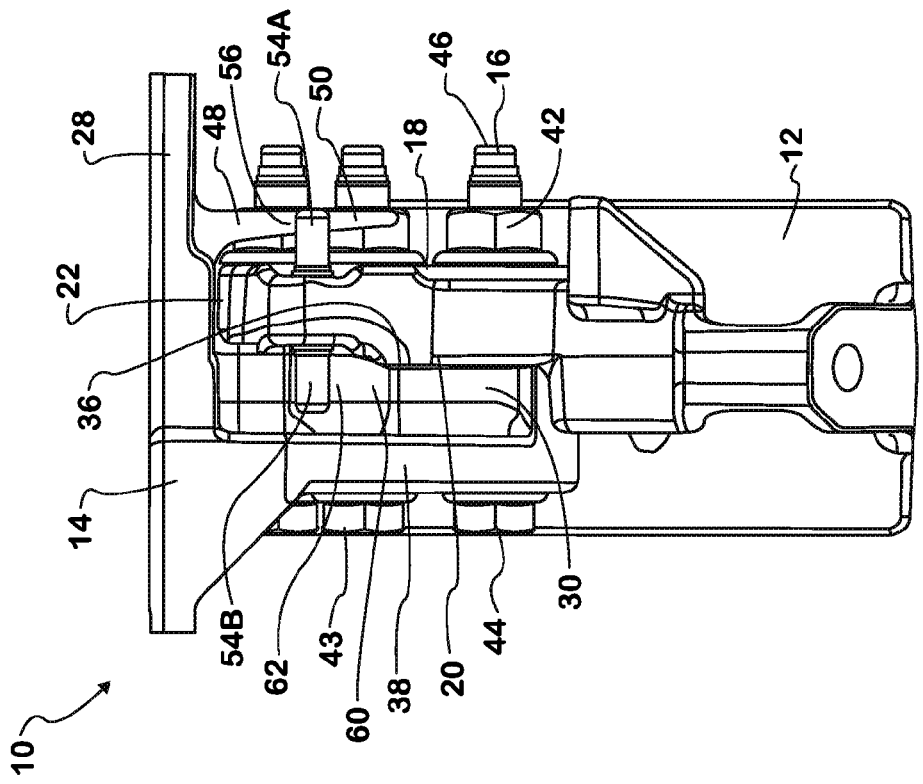
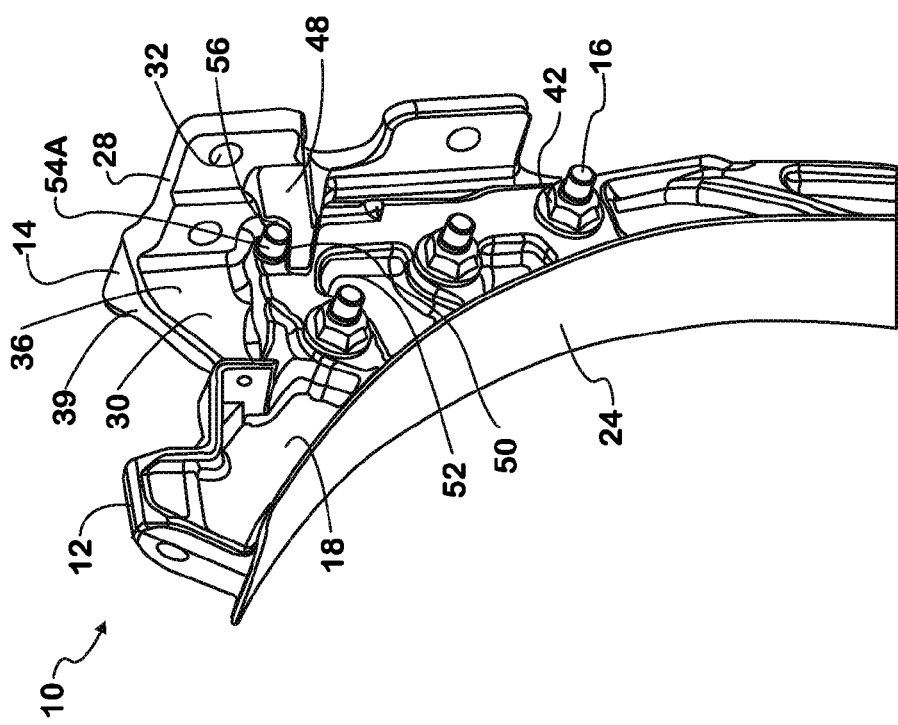

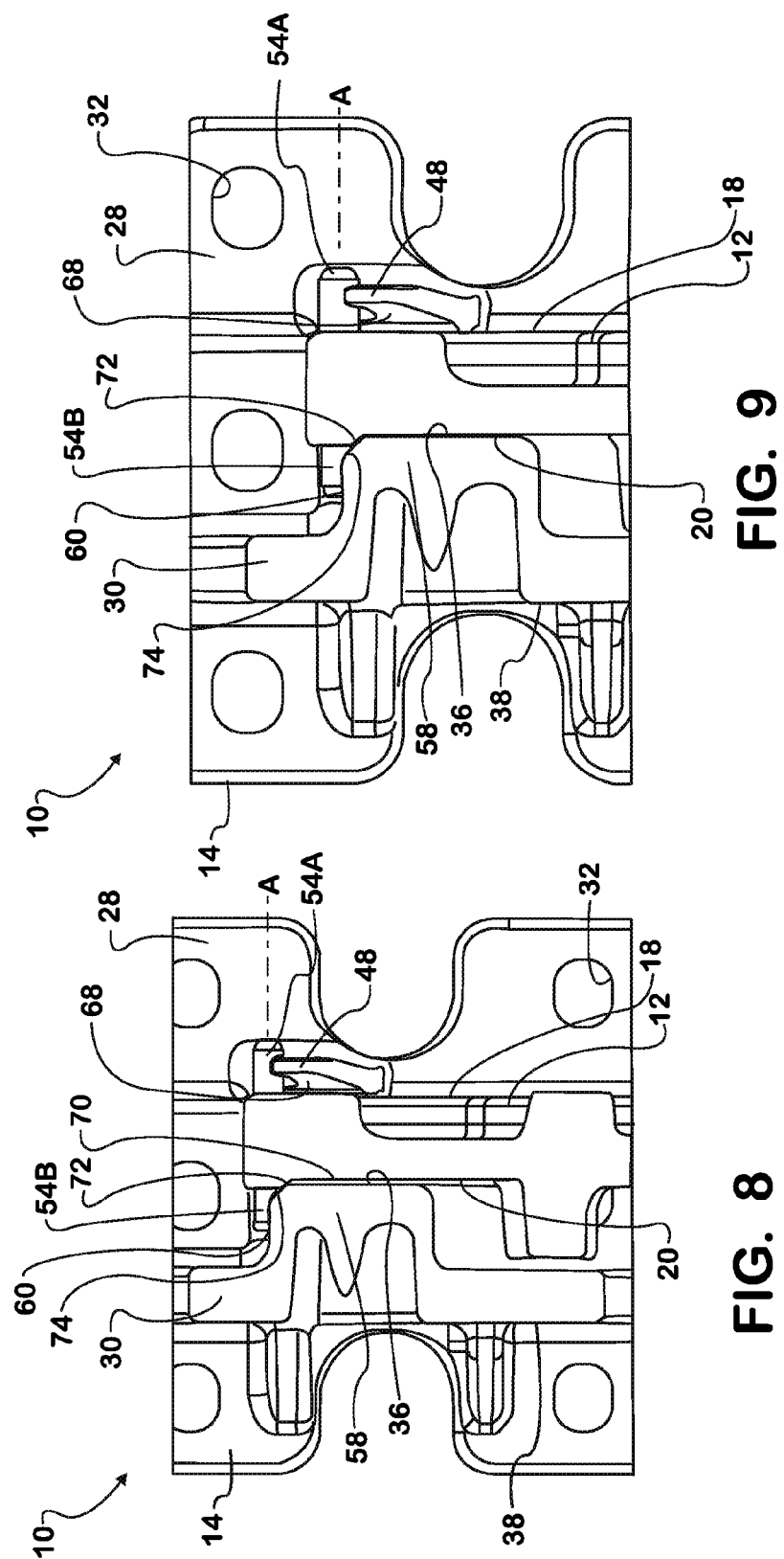

HANGER ASSEMBLY

BACKGROUND

Embodiments described herein relate to a hanger assembly for hanging components.

Hanger assemblies have many applications in the trucking and automotive industries, as well as in other related and unrelated industries. One use of a hanger assembly on a vehicle is to suspend a fuel tank, or other vehicle components, from a bracket mounted to the vehicle. The mounting brackets are typically mounted to a chassis component or to a chassis mounted component. The fuel tank is attached to the hanger assembly, often resting on a cradle-shaped support hanger and secured with a strap.

In one conventional hanger assembly 1 for a fuel tank shown in FIGS. 1-3, a generally "U"-shaped outer bracket 2 is disposed over a generally "U"-shaped inner bracket 3. Mounting bolts 4 span from a first outer surface of the outer bracket 2, through two parallel walls of the inner bracket 3, and through a second outer surface of the outer bracket 2. Locating pins 5 protrude outwardly from the two parallel walls of the inner bracket 3, and the locating pins are received in a channel 6 formed by a hook-shaped extension 7 in the outer bracket 2. Since the locating pin 5 engages the channel 6 of the outer bracket 2, the locating pin 5 carries some of the loading between the two brackets 2, 3, which may cause failure or sheering of the locating pin.

Referring to FIG. 2, the outer bracket 2 is manufactured with forming tolerances so that the outer bracket can be assembled over the inner bracket 3. These tolerances form a small gap 8 between the inner bracket 3 and the outer bracket 2.

Referring to FIG. 3, when the mounting bolts are tightened, the ends of the outer bracket 2 bend and displace against the inner bracket 3, decreasing the gap 8 near the ends and making the outer bracket non-perpendicular to a head 9 of the mounting bolt 4. When the outer bracket 2 is non-perpendicular to the head 9 of the mounting bolt 4, the mounting bolts may loosen.

SUMMARY

A hanger assembly includes a first bracket having a first side surface, a second side surface opposite the first side surface, and a locating pin disposed on the second side surface and extending generally perpendicularly from the second side surface. The assembly includes a mounting bracket configured to nest with the first bracket, where the mounting bracket has a base portion and an extension portion extending generally perpendicularly from the base portion. The extension portion has a first side surface that is configured to engage the second side surface of the first bracket. The mounting bracket also has a second side surface opposite the first side surface of the extension portion, and a top surface between the first side surface and the second side surface. At least one mounting bolt extends from the second side surface of the mounting bracket, through the mounting bracket, and through the first bracket to the first side surface of the first bracket such that the mounting bolt is secured against the second side surface of the mounting bracket at one end of the mounting bolt, and is secured against the first side surface of the first bracket at the opposite end of the mounting bolt. The first side surface and/or the top surface of the extension portion are configured to receive the locating pin.

Another hanger assembly includes a first bracket having a first side surface and a second side surface opposite the first side surface, and a locating pin disposed on the second side surface of the first bracket and extending generally outwardly from the second side surface. The hanger assembly also includes a mounting bracket configured to nest with the first bracket, the mounting bracket having a base portion and an extension portion extending generally perpendicularly from the base portion. The extension portion has a first side surface generally parallel to the second side surface of the first bracket, a second side surface generally parallel with and opposite to the first side surface of the extension portion, and a top surface generally perpendicular to and disposed between the first side surface and the second side surface of the extension portion. A mounting bolt extends from the second side surface of the mounting bracket, through the mounting bracket, and through the first bracket to the first side surface of the first bracket. A locating protrusion is disposed on the first bracket and/or the mounting bracket, and a receiving structure is disposed on the first bracket and/or the mounting bracket. The locating protrusion is configured to be received by the receiving structure to self-align the first bracket with respect to the mounting bracket.

A method of assembling a first bracket to a mounting bracket to form a hanger assembly includes the steps of guiding a locating pin disposed on a second side surface of the first bracket on a guide surface of the mounting bracket, and engaging the locating pin with a seat on the guide surface. The method further includes the steps of generally aligning the bolt holes disposed on the first bracket with the bolt holes disposed on the mounting bracket, and inserting protrusions on the first bracket or the mounting bracket into receiving structure on the other of the first bracket or the mounting bracket to locate the first bracket with respect to the second bracket.

BRIEF DESCRIPTION OF THE DRAWINGS

FIG. 4 is a side perspective view of a hanger assembly in an assembled position.

FIG. 5 is a top view of the hanger assembly in the assembled position.

FIG. 8 is a section view of the hanger assembly in the unassembled position.

FIG. 9 is a section view of the hanger assembly in the assembled position.

DETAILED DESCRIPTION

Figure 1:
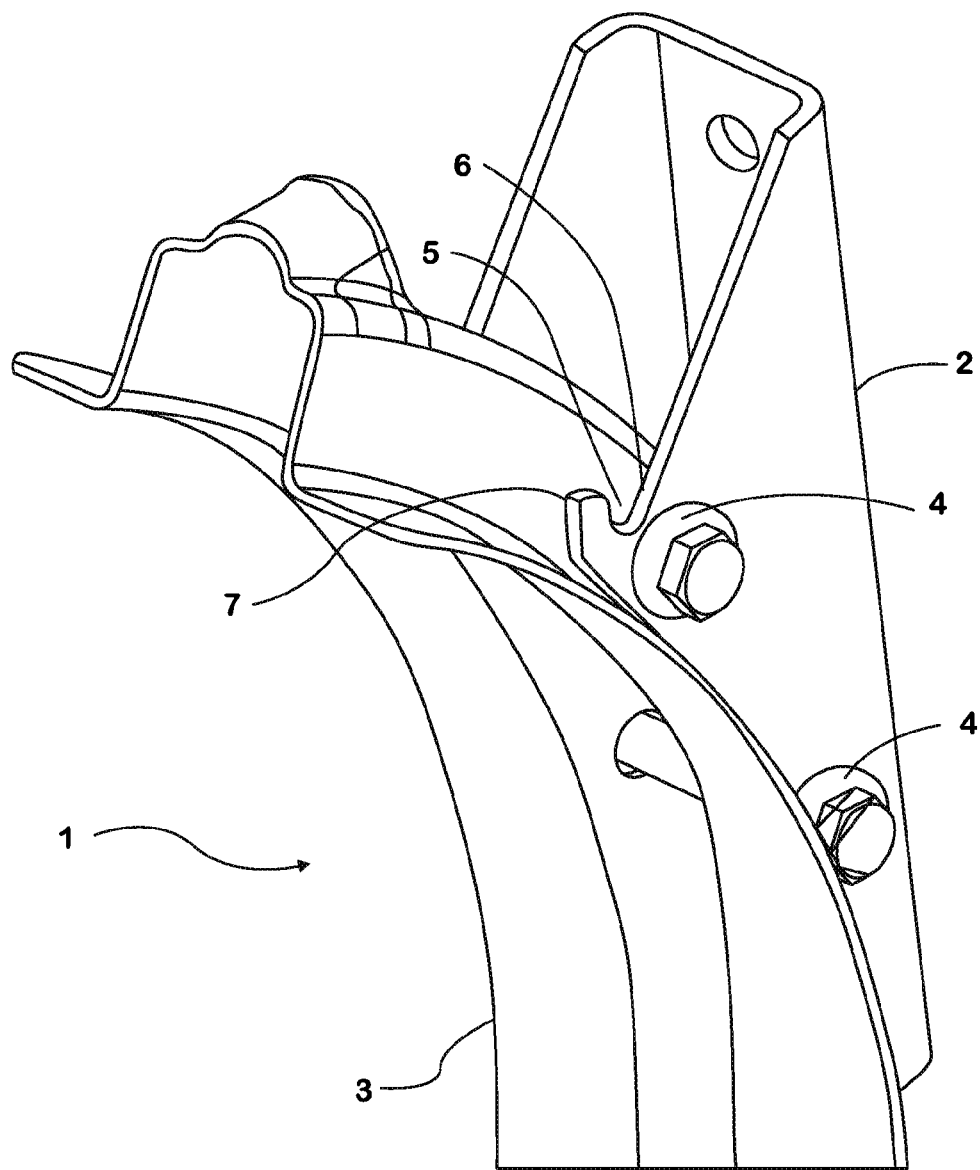
FIG. 1 is a side perspective view of a conventional hanger assembly.
Figure 3:
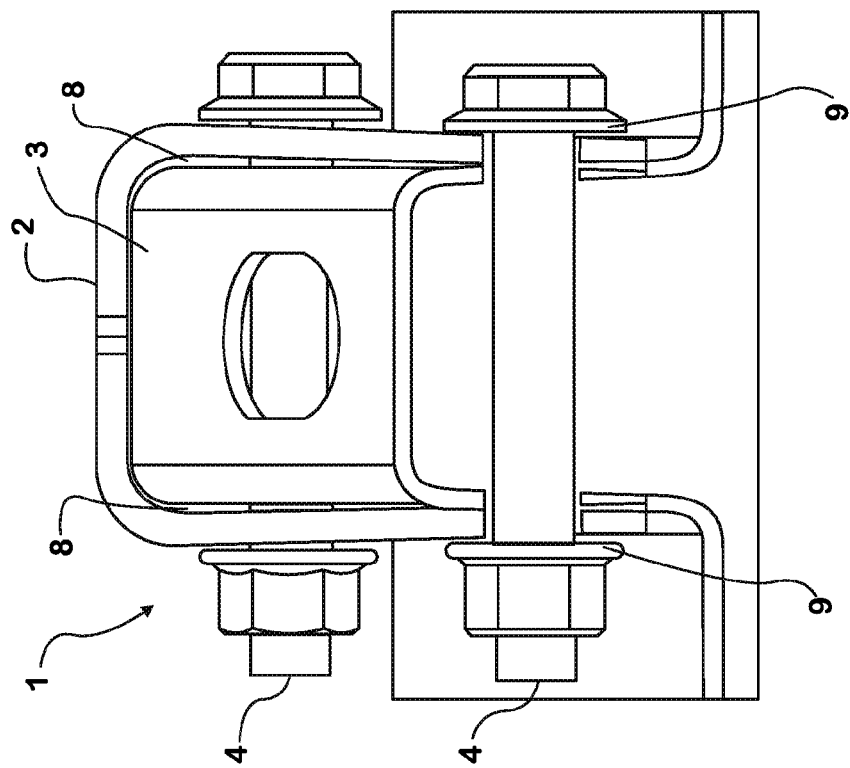
FIG. 3 is a section view of the conventional hanger assembly.
Figure 2:
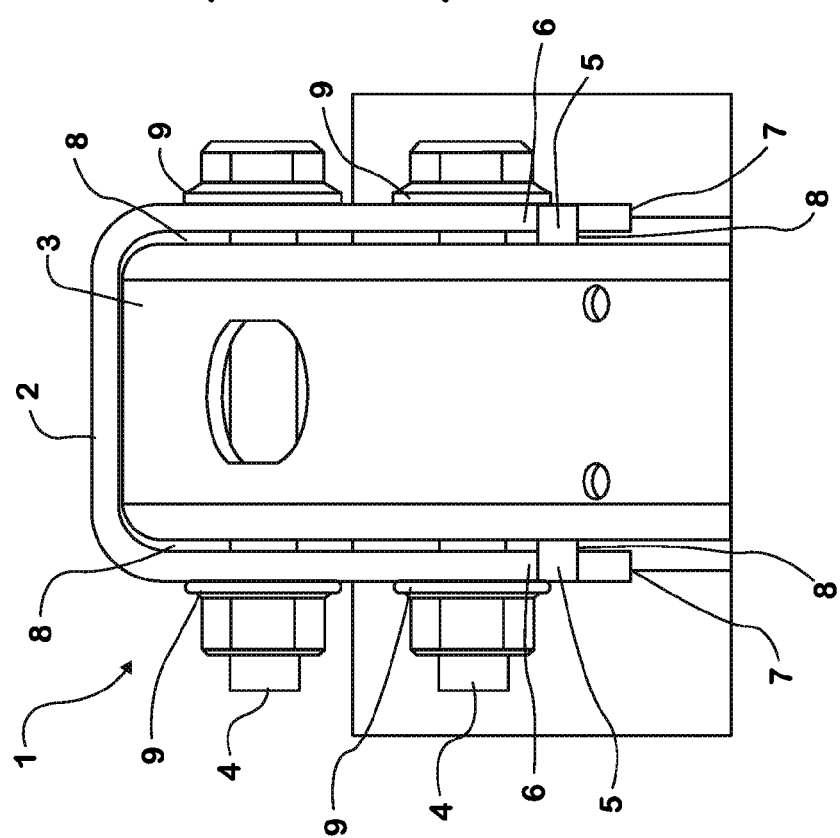
FIG. 2 is a top view of the conventional hanger assembly.

Referring to FIGS. 4-7, a hanger assembly is indicated generally at 10 and includes a first bracket 12 attachable to a mounting bracket 14 with at least one mounting bolt 16. When assembled, the first bracket 12 and the mounting bracket 14 are configured to nest together. While the hanger assembly 10 will be described below with reference to a hanger assembly for a fuel tank (not shown) of a vehicle (not shown), it is contemplated that the hanger assembly can be used for other vehicle applications, and for applications both related to and unrelated to vehicles. The mounting bracket 14 may be mounted to a chassis component (not shown) or to a chassis mounted component of the vehicle. The fuel tank may be attached to the first bracket 12. Additionally, while the first bracket 12 may be the bracket that attaches to the component to be suspended and the mounting bracket 14 may be the bracket that attaches to the supporting component, it is possible that the first bracket can be attached to the supporting component and the mounting bracket can be attached to the component to be suspended.

The first bracket 12 may have a first side surface 18, a second side surface 20 generally parallel to and opposite of the first side surface, and a back surface 22. The first bracket may have a generally elongate and arcuate shape corresponding to the shape of a fuel tank, however other shapes are possible. A front surface 24 may be cradle-shaped for engaging the fuel tank, or alternatively, may be shaped to receive other components to be suspended. Bolt holes 26 extend from the first side surface 18 to the second side surface 20. In the embodiment of FIG. 4, the first bracket 12 has three spaced bolt holes 26 that are generally linear, and in the embodiment of FIG. 6, the first bracket has three spaced bolt holes in a triangular shape, however other numbers and arrangements are possible.

Figure 7:
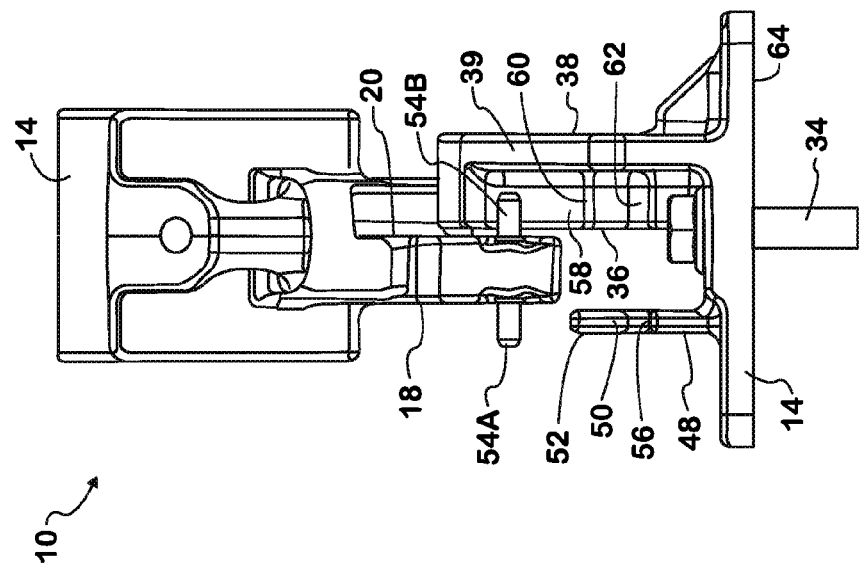
FIG. 7 is a top view of the hanger assembly in the unassembled position.
Figure 6:
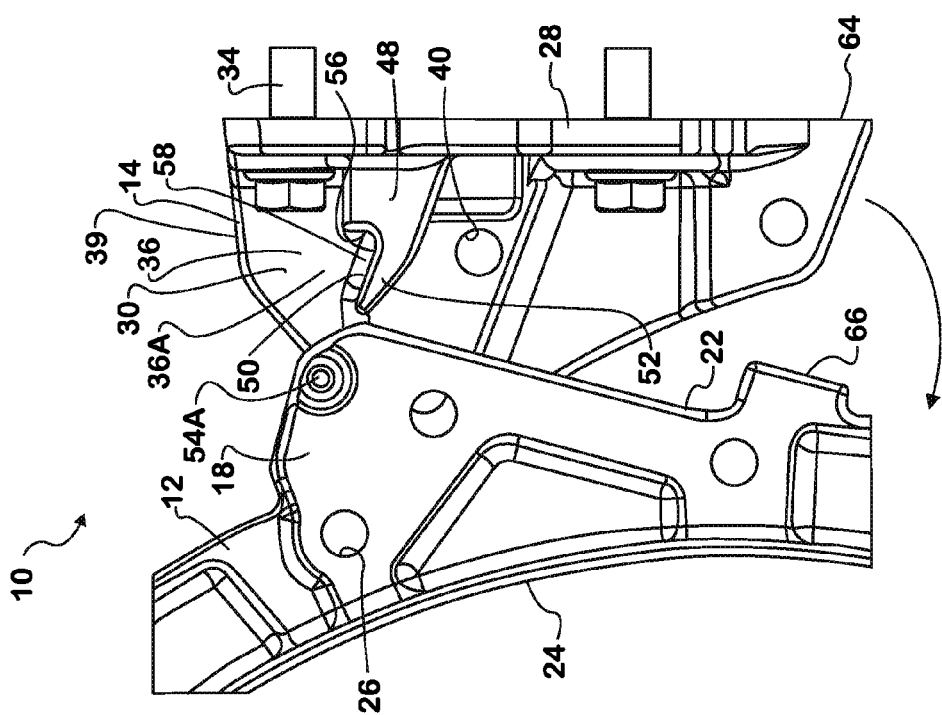
FIG. 6 is a side view of the hanger assembly in an unassembled position.
Figure 10:
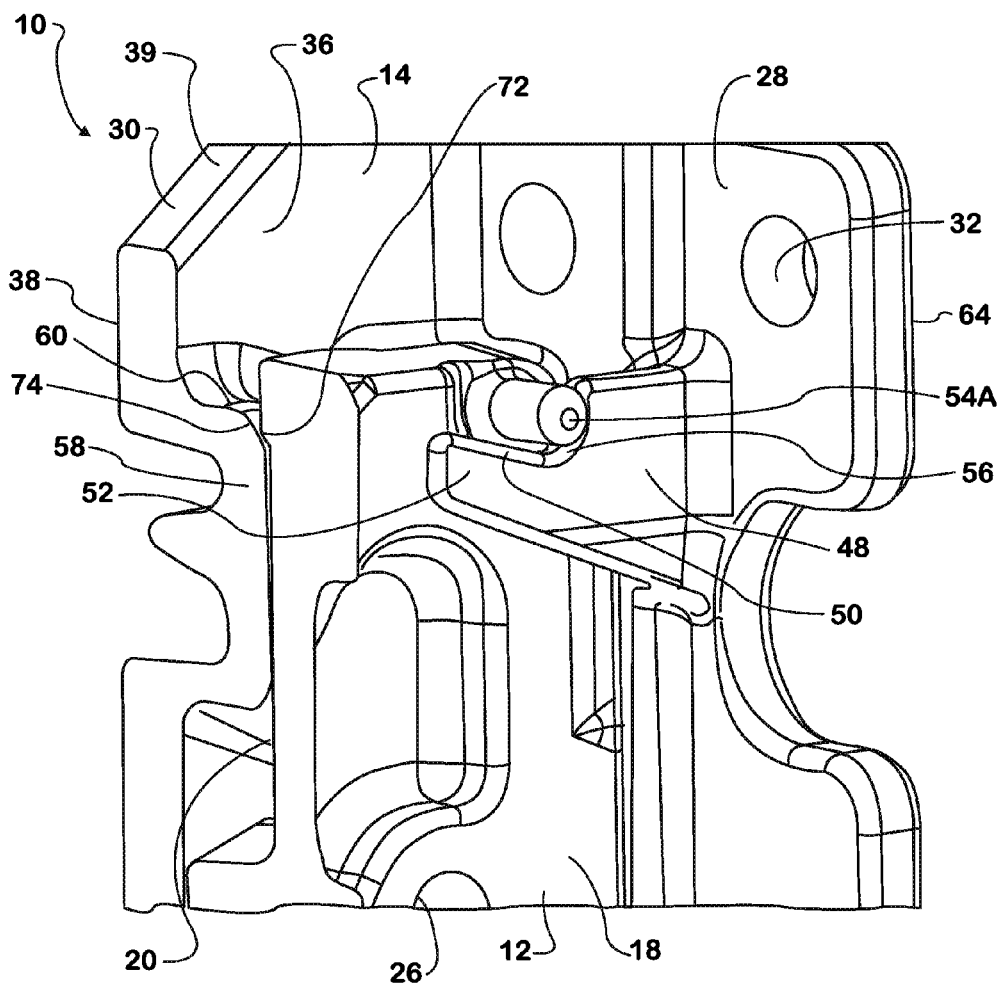
FIG. 10 is a section view of the hanger assembly in the assembled position.
Figure 12:
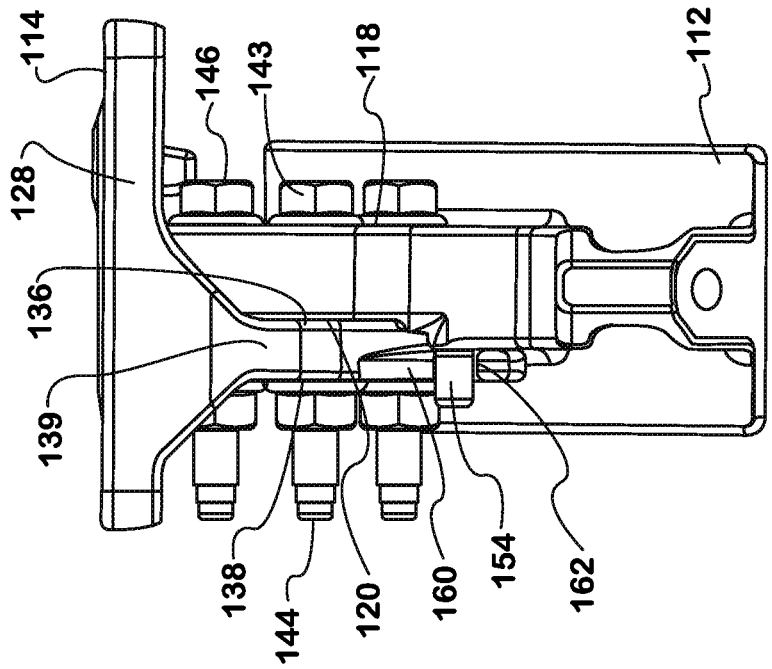
FIG. 12 is a top view of the second embodiment of hanger assembly in the assembled position.

The mounting bracket 14 has a base portion 28 and an extension portion 30 extending generally perpendicularly from the base portion. The extension portion 30 may extend from the base portion 28 generally offset from the center of the base portion (as seen in FIGS. 5 and 7). Bolt holes 32 may extend through the base portion 28 for receiving mounting bolts 34 (FIGS. 6 and 7) for attaching the mounting bracket 14 to a secondary object (not shown), for example the chassis component of a vehicle, although other objects are possible. The mounting bolts 34 are configured to extend generally parallel with the extension portion 30, however other orientations are possible.

The extension portion 30 has a first side surface 36, a second side surface 38 opposite of the first side surface, and a top surface 39 between the first surface and the second surface. The side surfaces 36, 38 of the mounting bracket 14 are generally parallel with the side surfaces 18, 20 of the first bracket 12, and the top surface 39 is generally perpendicular to the side surfaces 36, 38. Bolt holes 40 are disposed through the mounting bracket 14 from the first side surface 36 to the second side surface 38. The first side surface 36 of the mounting bracket 14 is configured to engage the second side surface 20 of the first bracket 12, and the base portion 28 of the mounting bracket is configured to oppose the back surface 22 of the first bracket. When the first bracket 12 is received in the mounting bracket 14, the bolt holes 26 on the first bracket and the bolt holes 40 on the second bracket are generally aligned for receiving the mounting bolts 16. The mounting bolts 16 are inserted into the bolt holes 26, 40, and the bolt nuts 42 are tightened to secure the first bracket 12 to the mounting bracket 14. The mounting bolts 16 extend from the second side surface 38 of the mounting bracket 14, through the mounting bracket, and through the first bracket 12 to the first side surface 18 of the first bracket such that the mounting bolt is secured against the second side surface of the mounting bracket at one end 44 of the mounting bolt, and is secured against the first side surface of the first bracket at the opposite end 46 of the mounting bolt. The mounting bolts 16 may be secured with bolt nuts 42, although other ways of securing the mounting bolts are possible.

Extending from the base portion 28 generally parallel to the extension portion 30 is a locator formation 48. The locator formation 48 may define a channel 50 disposed on a hook-shaped extension 52, although other shapes are possible. The channel 50 is configured to receive a locating pin 54A. A stop surface 56 is disposed at the end of the channel 50 to engage the locating pin 54A.

On the extension portion 30 opposite from the locator formation 48, the first side surface 36 includes a protruding portion 58 that extends perpendicularly from a first portion 36A of the first side surface 36 outwardly towards the second surface 20 of the first bracket 12. The protruding portion 58 may be a region of increased width of the extension portion 30. A generally smooth guide surface 60 that is configured to guide a locating pin 54B is defined by the protruding portion 58. The guide surface 60 may be linear or curved, and includes a seat 62 that is sized and shaped to engage the locating pin 54B so that the locating pin 54B becomes seated in the seat 62. The seat 62 is generally aligned with the stop surface 56 of the locator formation 48.

The locating pin 54A protrudes outwardly, for example generally perpendicularly, from the first side surface 18 of the first bracket 12 and the locating pin 54B protrudes outwardly, for example generally perpendicularly, from the second side surface 20 of the first bracket 12. The locating pins 54A, 54B are generally aligned with each other but are disposed on opposite sides 18, 20 of the first bracket 12, however other configurations are possible. The first side surface 36 of the extension portion 30 is configured to receive the locating pin 54B at the guide surface 60. The locator formation 48 is configured to receive the locating pin 54A.

When the first bracket 12 and the mounting bracket 14 are assembled, the two brackets are positioned such that the locating pin 54A on the first side surface 18 is received in the channel 50 formed by the hook-shaped extension 52 on the locator formation 48, and the other locating pin 54B is received in the guide surface 60 of the extension portion 30. Generally simultaneously, the locating pin 54A travels on the channel 50 until the locating pin 54A engages the stop surface 56, and the other locating pin 54B travels on the guide surface 60 until the locating pin 54B engages the seat 62.

When the locating pins 54A, 54B are engaged with the stop surface 56 and the seat 62, respectively, or alternately when either of the locating pins 54A, 54B are engaged with the stop surface 56 or the seat 62, the first bracket 12 and the mounting bracket 14 can be pivoted with respect to each other about an axis A (FIGS. 8 and 9) at the center of the locating pin. When the brackets 12, 14 are pivoted in the direction generally shown in FIG. 6, a back surface 64 of the base portion 28 may be generally aligned with a knee surface 66 of the first bracket 12 to form a generally continuous, generally planar surface. It is possible that the surfaces 18, 20 of the first bracket 12 may have clearance indentations to avoid interferences with the mounting bolts 34 when the brackets 12, 14 are engaged and pivoted with respect to each other.

Referring now to FIGS. 8 and 9, when the locating pins 54A, 54B are engaged with the stop surface 56 and the seat 62, there may be a gap 68 between the first side 18 of the first bracket 12 and the locator formation 48, and there may be a gap 70 between the second side 20 of the first bracket 12 and the first side 36 of the mounting bracket 14. The gaps 68, 70 may be the result of manufactured tolerances to allow the assembly of the two brackets 12, 14.

A first chamfer edge 72 is disposed on the second surface 20 of the first bracket 12, and a second chamfer edge 74 is disposed on the protruding portion 58 of the extension portion 30. The first and second chamfer edges 72, 74 may be 45-degrees with respect to the second surface 20 of the first bracket 12 and the first surface 36 of the mounting bracket 14, respectively, however other angles are possible.

After the first bracket 12 and the mounting bracket 14 are pivoted to align the bolt holes 26, 40, the mounting bolts 16 can be inserted into the bolt holes. When the mounting bolts 16 are received in the bolt holes 26, 40, and as the mounting bolts are tightened, the first chamfer edge 72 will travel up the second chamfer edge 74, reducing or eliminating the gap 70 between the first bracket 12 and the mounting bracket 14. With the gap 70 eliminated, the first side surface 36 of the mounting bracket 14 will generally flushly engage the second side surface 20 of the first bracket 12, and the orientation of the first bracket with respect to the mounting bolts 16 and the orientation of the mounting bracket with respect to the mounting bolts will both be generally perpendicular. The mounting bolt 16 extends from the second side surface 38 of the mounting bracket 14, through the mounting bracket, and through the first bracket 12 to the first side surface 18 of the first bracket such that the mounting bolt is generally flushly secured against the second side surface of the mounting bracket at one end of the mounting bolt, and is generally flushly secured against the first side surface of the first bracket at the opposite end of the mounting bolt. With a perpendicular orientation between the bolt nut 42 and the bolt head 43 to the brackets 12, 14, the mounting bolts 16 may be less susceptible to loosening.

When the first chamfer edge 72 displaces or travels up the second chamfer edge 74, the first and second chamfer edges engage, and the locating pins 54A, 54B of the first bracket 12 are lifted off of the seat 62 and off of the channel 50 of the mounting bracket 14. With the locating pins 54A, 54B having little to no contact with the seat 62 and the channel 50, and therefore little to no contact with the mounting bracket 14, the loading on the locating pins may be reduced or eliminated.

Referring to FIGS. 11-14, a second embodiment of hanger assembly is indicated generally at 110. Similar features to the first embodiment 10 are indicated with similar reference numbers in the 100-series. The hanger assembly 110 includes a first bracket 112 that is attachable to a mounting bracket 114 with at least one mounting bolt 116. When assembled, the first bracket 112 and the mounting bracket 14 are configured to nest together. While the hanger assembly 110 will be described below with reference to a hanger assembly for a fuel tank (not shown) of a vehicle (not shown), it is contemplated that the hanger assembly can be used for other vehicle applications, and for applications both related to and unrelated to vehicles. The mounting bracket 114 may be mounted to a chassis component (not shown) or to a chassis mounted component of the vehicle. The fuel tank may be attached to the first bracket 112. Additionally, while the first bracket 112 may be the bracket that attaches to the component to be suspended and the mounting bracket 114 may be the bracket that attaches to the supporting component, it is possible that the first bracket can be attached to the supporting component and the mounting bracket can be attached to the component to be suspended.

Figure 11:
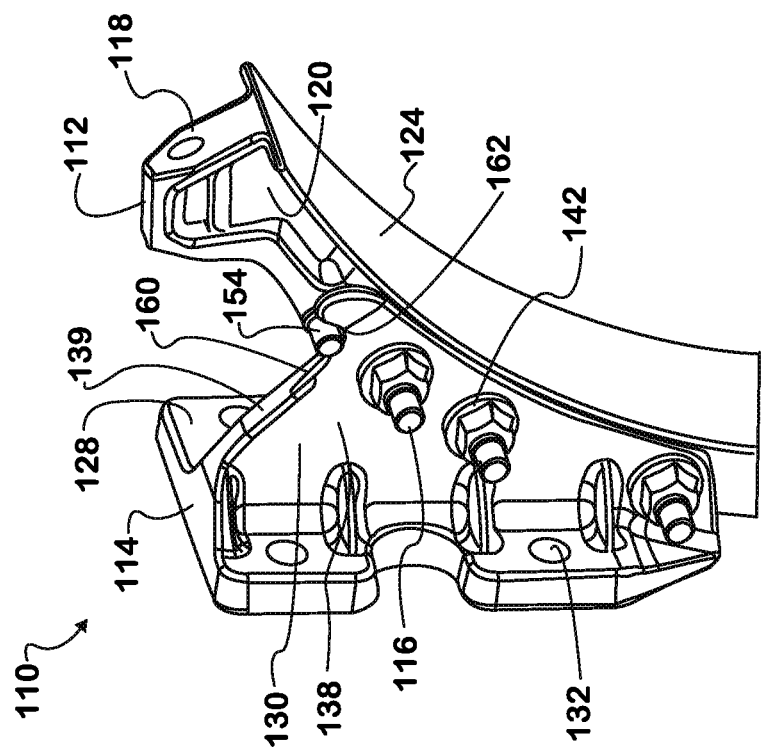
FIG. 11 is a side perspective view of a second embodiment of hanger assembly in an assembled position.

The first bracket 112 may have a first side surface 118, and a second side surface 120 generally parallel with and opposite of the first side surface. The first bracket 112 may have a generally elongate and arcuate shape corresponding to the shape of a fuel tank, however other shapes are possible. A front surface 124 may be cradle-shaped for engaging the fuel tank, or alternatively, may be shaped to receive other components to be suspended. Bolt holes 126 extend from the first side surface 118 to the second side surface 120. In the embodiment of FIG. 11, the first bracket 112 has three spaced bolt holes 126, however other numbers are possible.

The mounting bracket 114 has a base portion 128 and an extension portion 130 extending generally perpendicularly from the base portion. Bolt holes 132 may extend through the base portion 128 for receiving mounting bolts (not shown) for attaching the mounting bracket 114 to a secondary object (not shown), for example the chassis component of a vehicle, although other objects are possible. The mounting bolts 134 are configured to extend generally parallel with the extension portion 130, however other orientations are possible.

The extension portion 130 has a first side surface 136 and a second side surface 138 opposite of the first side surface. The side surfaces 136, 138 of the mounting bracket 114 are generally parallel with the side surfaces 118, 120 of the first bracket 112. Bolt holes 140 are disposed through the mounting bracket 114 from the first side surface 136 to the second side surface 138. The first side surface 136 of the mounting bracket 114 is configured to engage the second side surface 120 of the first bracket 112. When the first bracket 112 is received in the mounting bracket 114, the bolt holes 126 on the first bracket and the bolt holes 140 on the second bracket are generally aligned for receiving the mounting bolts 116. The mounting bolts 116 are inserted into the bolt holes 126, 140, and the bolt nuts 142 are tightened to secure the first bracket 112 to the mounting bracket 114. The mounting bolts 116 extend from the second side surface 138 of the mounting bracket 114, through the mounting bracket, and through the first bracket 112 to the first side surface 118 of the first bracket such that the mounting bolt is secured against the second side surface of the mounting bracket at one end 144 of the mounting bolt, and is secured against the first side surface of the first bracket at the opposite end 146 of the mounting bolt. The mounting bolts 116 may be secured with bolt nuts 142, although other ways of securing the mounting bolts are possible.

On the extension portion 130, a top surface 139 that is generally perpendicular and extends between the first side surface 136 and the second side surface 138 defines a guide surface 160 configured to guide a locating pin 154. The guide surface 160 may be generally smooth and includes a seat 162 sized and shaped to receive the locating pin 154 such that the locating pin 54 becomes seated in the seat 162. The guide surface 162 disposed on the top surface of the extension portion may be inclined and from the proximal end (nearest the base portion 132) to the distal end, terminating in a hook-shape that defines the seat 162. While on the first bracket 112, the locating pin 154 protrudes outwardly, for example generally perpendicularly, from the second side surface 120. The top surface 139 of the extension portion 130 is configured to receive the locating pin 54 at the guide surface 160 when the first bracket 112 and the mounting bracket 114 are assembled.

Figure 13:
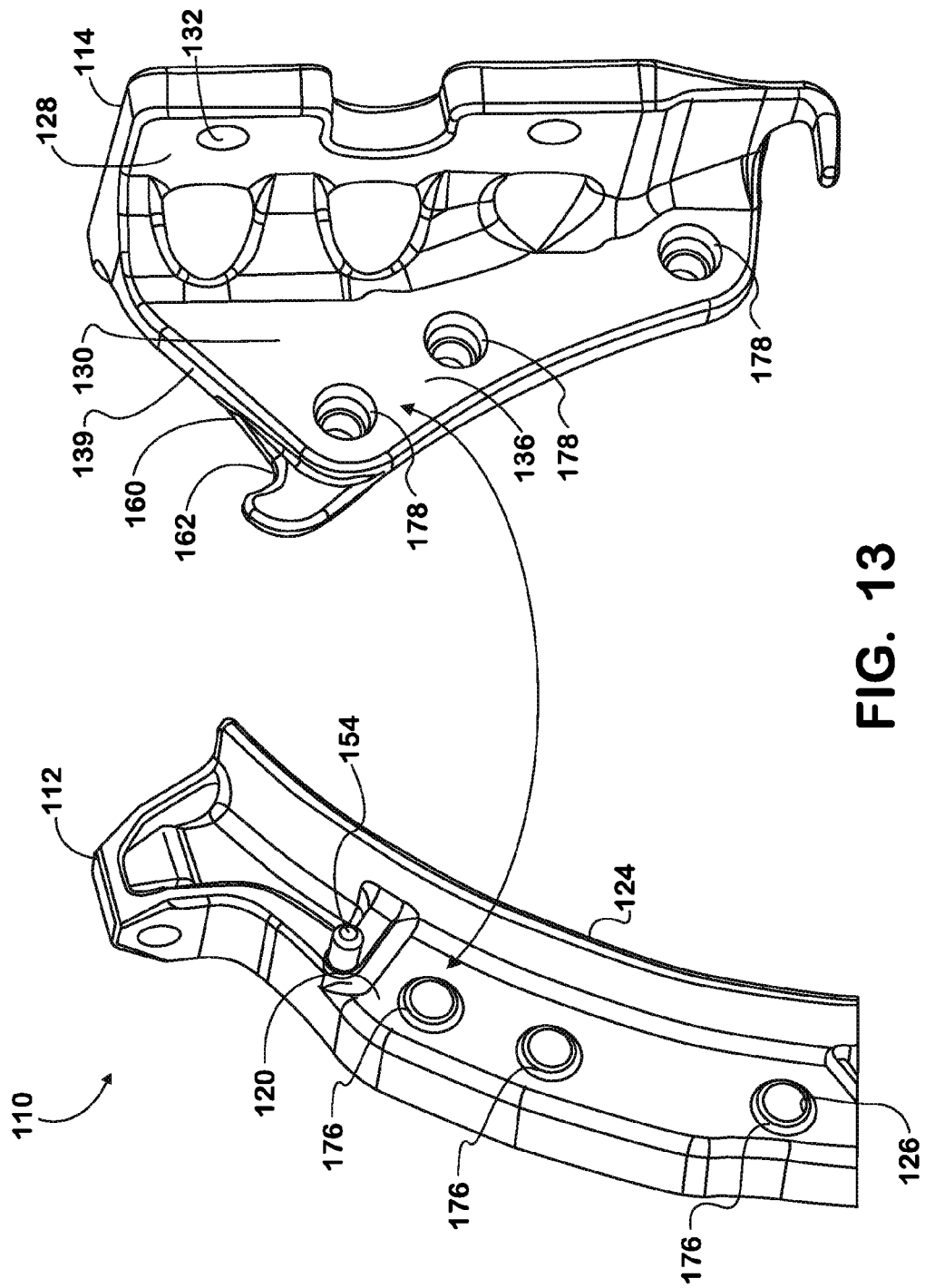
FIG. 13 is a side perspective view of the second embodiment of hanger assembly in an unassembled position.

Referring now to FIG. 13, the first bracket 112 has locating protrusions 176 on the side of the bracket that is configured to engage the mounting bracket 114, such as the second side surface 120, although the locating protrusions can also be located on the first side surface 118. In the embodiment of FIG. 13, the locating protrusions 176 are raised lips around the bolt holes 126. The raised lips 176 are configured to be received in receiving structure 178 on the mounting bracket 114, such as at the first side 136. In the embodiment of FIG. 13, the receiving structure 178 is an enlarged aperture around the bolt holes 140 on the mounting bracket 114. The enlarged aperture 178 refers to an increased diameter with respect to the remainder of the bolt holes 140, and the enlarged aperture may have a thickness into the extension portion 130. Further, the enlarged aperture 178 may have a constant or tapering diameter. It is possible that one or more of the bolt holes 126 have the raised lips 176, and that one or more of the bolt holes 140 have the enlarged apertures 178. Further, it is possible that the locating protrusions can be sized and shaped differently, or can be other configurations than raised lips 176, and can be located on the first bracket 112 at other locations than at the bolt holes 126. Likewise, it is possible that the receiving structure 178 can be sized and shaped differently, or can be other configurations other than enlarged apertures 178, and can be located on the mounting bracket 114 at other locations than at the bolt holes 140. It is also possible that the locating protrusions 176 can be located on the mounting bracket 114, and that the receiving structure 178 can be located on the first bracket 112, or a combination of each on each bracket.

The locating protrusions 176 and the receiving structure 178 provide self-alignment of the first bracket 112 and the mounting bracket 114. After the locating protrusions 176 are engaged in the receiving structure 178, the mounting bolts 116 can be inserted into the bolt holes 126, 140. When the mounting bolts 116 are received in the bolt holes 126, 140, and as the mounting bolts are tightened, the first side surface 136 of the mounting bracket 114 will generally flushly engage the second side surface 120 of the first bracket 112, and the orientation of the first bracket with respect to the mounting bolts 116 and the orientation of the mounting bracket with respect to the mounting bolts will both be generally perpendicular. The mounting bolt 116 extends from the second side surface 138 of the mounting bracket 114, through the mounting bracket, and through the first bracket 112 to the first side surface 118 of the first bracket such that the mounting bolt is generally flushly secured against the second side surface of the mounting bracket at one end of the mounting bolt, and is generally flushly secured against the first side surface of the first bracket at the opposite end of the mounting bolt. With a perpendicular orientation between the bolt nut 142 and the bolt head 143 to the brackets 112, 114, the mounting bolts 116 may be less susceptible to loosening.

Figure 14:
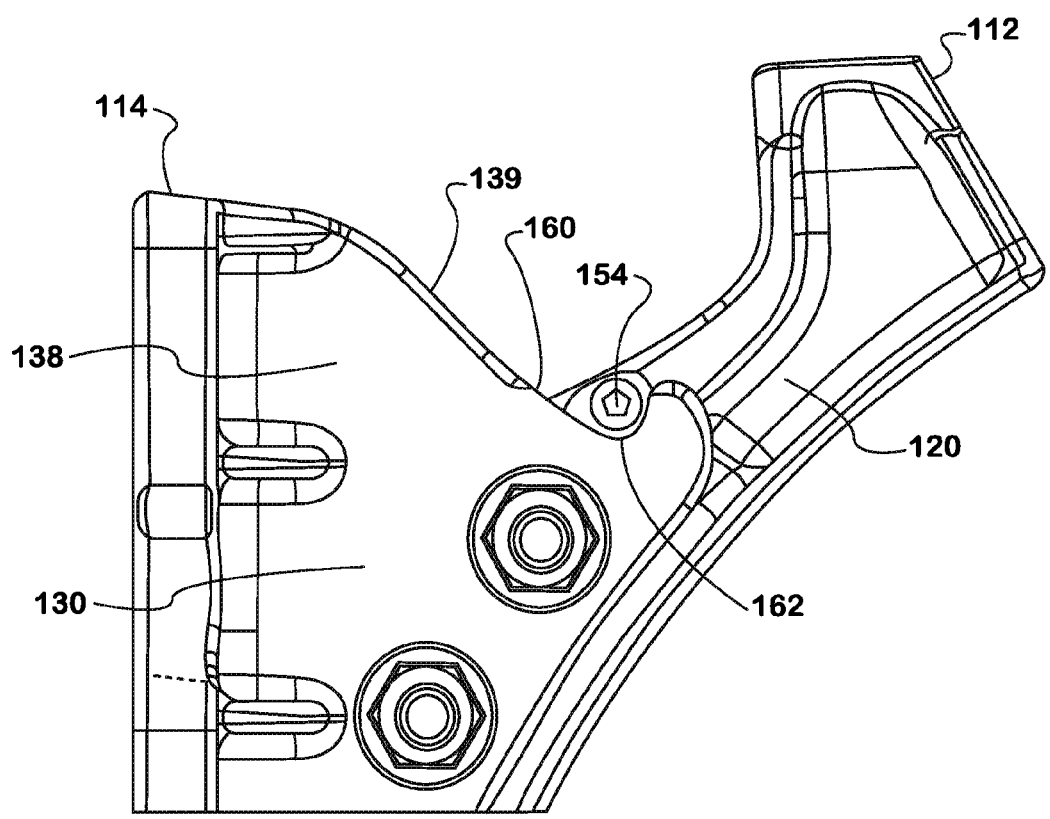
FIG. 14 is a side view of the second embodiment of hanger assembly in the assembled position.

When the locating protrusions 176 are engaged in the receiving structure 178, the locating pin 154 of the first bracket 112 is lifted off of the seat 162 (seen in FIG. 14). With the locating pin 154 having little to no contact with the seat 162, and therefore little to no contact with the mounting bracket 114, the loading on the locating pins may be reduced or eliminated.

The hanger assembly 10, 110 may be formed of die cast aluminum, which allows smaller tolerances for a generally flush engagement of the first bracket 12, 112 and the second bracket 14, 114. With the smaller tolerances, the first side surface 18, 118 of the first bracket 12, 112 remains perpendicular to the mounting bolt nut 42, 142 (or bolt head 43, 143), and the second side surface 38, 138 of the mounting bracket 14, 114 remains perpendicular to the mounting bolt nut 42, 142 (or bolt head 43, 143), which reduces the amount of bolt loosening.

What is claimed is:

1. A hanger assembly comprising:
    a first bracket having a first side surface and a second side surface opposite the first side surface;
    a locating pin disposed on the second side surface of the first bracket and extending generally perpendicularly from the second side surface;
    a mounting bracket configured to nest with the first bracket, the mounting bracket having a base portion, an extension portion extending generally perpendicularly from the base portion, the extension portion having a first side surface that is configured to engage the second side surface of the first bracket, the mounting bracket having a second side surface opposite the first side surface of the mounting bracket, the mounting bracket having a top surface between said first side surface and said second side surface; and
    at least one mounting bolt that extends from the second side surface of the mounting bracket, through the mounting bracket, and through the first bracket to the first side surface of the first bracket such that the mounting bolt is secured against the second side surface of the mounting bracket at one end of the mounting bolt, and is secured against the first side surface of the first bracket at the opposite end of the mounting bolt;
    wherein at least one of the first side surface and the top surface of the extension portion are configured to receive the locating pin,
    wherein the at least one of the first side surface and the top surface define a guide surface that includes a seat, wherein the seat is configured to receive the locating pin during assembly.

2. The hanger assembly of claim 1 wherein the guide surface has a general hook-shape defining the seat.

3. The hanger assembly of claim 1 wherein during assembly, the first bracket and the mounting bracket are pivotable with respect to each other about an axis at the center of the locating pin when the locating pin is engaged with the seat.

4. The hanger assembly of claim 1 wherein the locating pin is lifted off of the seat when the at least one mounting bolt is secured.

5. The hanger assembly of claim 1 further comprising a locating pin disposed on the first side surface of the first bracket and extending generally perpendicularly from the first side surface.

6. The hanger assembly of claim 5 further comprising a locator formation extending from the base portion of the mounting bracket generally parallel to the extension portion, the locator formation configured to receive the locating pin disposed on the first side surface of the first bracket.

7. The hanger assembly of claim 1 wherein the first side surface of the extension portion defines a protruding portion that extends towards the second surface of the first bracket, the protruding portion having a guide surface configured to guide the locating pin disposed on the second surface of the first bracket during assembly.

8. The hanger assembly of claim 7 further comprising a first chamfer edge disposed on the second surface of the first bracket, and a second chamfer edge disposed on the protruding portion of the extension portion.

9. The hanger assembly of claim 1 further comprising a locating protrusion on at least one of the first bracket and the mounting bracket, and a receiving structure on at least one of the first bracket and the mounting bracket, wherein the locating protrusion is configured to be received by the receiving structure to self-align the first bracket with respect to the mounting bracket.

10. The hanger assembly of claim 9 wherein the locating protrusion comprises a raised lip around a bolt hole, and the receiving structure comprises an enlarged aperture at a corresponding bolt hole.

11. The hanger assembly of claim 1 wherein the top surface of the extension portion defines a guide surface that is configured to receive the locating pin at a seat during assembly.

12. A hanger assembly comprising:
    a first bracket having a first side surface and a second side surface opposite the first side surface;

a locating pin disposed on the second side surface of the first bracket and extending generally outwardly from the second side surface;

a mounting bracket configured to nest with the first bracket, the mounting bracket having a base portion and an extension portion extending generally perpendicularly from the base portion, the extension portion having a first side surface generally parallel to the second side surface of the first bracket, a second side surface generally parallel with and opposite to the first side surface of the extension portion, and a top surface generally perpendicular to and disposed between the first side surface and the second side surface of the extension portion;

at least one mounting bolt that extends from the second side surface of the mounting bracket, through the mounting bracket, and through the first bracket to the first side surface of the first bracket;

a locating protrusion on at least one of the first bracket and the mounting bracket, and a receiving structure on at least one of the first bracket and the mounting bracket, wherein the locating protrusion is configured to be received by the receiving structure to self-align the first bracket with respect to the mounting bracket, and a guide surface disposed on the top surface of the extension portion, the guide surface being configured to receive the locating pin during assembly.

13. The hanger assembly of claim 12 wherein the locating pin is lifted off of the guide surface when the locating protrusion is received by the receiving structure.

14. The hanger assembly of claim 12 wherein the locating protrusion comprises a raised lip around a bolt hole, and the receiving structure comprises an enlarged aperture at a corresponding bolt hole.

15. A method of assembling a first bracket to a mounting bracket to form a hanger assembly, the method comprising the steps of:

guiding a locating pin disposed on a second side surface of the first bracket on a guide surface of the mounting bracket, engaging the locating pin with a seat on the guide surface;

generally aligning bolt holes disposed on the first bracket with bolt holes disposed on the mounting bracket;

inserting protrusions on one of the first bracket and the mounting bracket into receiving structure on the other of the one of the first bracket and the mounting bracket to locate the first bracket with respect to the second bracket;

inserting mounting bolts through the generally aligned bolt holes, and tightening the mounting bolts; and lifting the locating pin off of the seat when the protrusions are received in the bolt.

16. The method of claim 15 further comprising the step of engaging a first side surface of the mounting bracket to the second side surface of the first bracket.

* * * * *